US009017468B2

United States Patent
Adamic et al.

(10) Patent No.: US 9,017,468 B2
(45) Date of Patent: Apr. 28, 2015

(54) COLORANT DISPERSION FOR AN INK

(75) Inventors: Raymond Adamic, Corvallis, OR (US); Vladek Kasperchik, Corvallis, OR (US); Vladimir Jakubek, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 198 days.

(21) Appl. No.: 13/455,914

(22) Filed: Apr. 25, 2012

(65) Prior Publication Data

US 2013/0284050 A1 Oct. 31, 2013

(51) Int. Cl.
C09D 11/00 (2014.01)
C09D 11/037 (2014.01)
C09D 11/322 (2014.01)

(52) U.S. Cl.
CPC ............ *C09D 11/037* (2013.01); *C09D 11/322* (2013.01)

(58) Field of Classification Search
USPC .................. 106/31.6, 31.65, 31.86, 31.75
See application file for complete search history.

(56) References Cited

U.S. PATENT DOCUMENTS

| 6,114,156 | A  | 9/2000  | McDaniel et al. |
| 6,499,839 | B1 | 12/2002 | Busby et al. |
| 6,506,245 | B1 | 1/2003  | Kinney et al. |
| 6,554,891 | B1 | 4/2003  | Momose et al. |
| 2006/0167135 | A1 | 7/2006 | Beach et al. |
| 2006/0167137 | A1 | 7/2006 | Hallden-Abberton et al. |
| 2007/0003463 | A1 | 1/2007 | Ajiri |
| 2007/0078200 | A1 | 4/2007 | Yoshida et al. |
| 2007/0140951 | A1 | 6/2007 | O'Brien et al. |
| 2007/0167019 | A1 | 7/2007 | Zurcher et al. |
| 2009/0226376 | A1 | 9/2009 | Grimmond et al. |
| 2009/0312457 | A1 | 12/2009 | Tokumitsu |
| 2010/0027192 | A1 | 2/2010 | Perry et al. |
| 2010/0028537 | A1 | 2/2010 | Goredema et al. |
| 2010/0203093 | A1 | 8/2010 | Bujard et al. |

(Continued)

FOREIGN PATENT DOCUMENTS

| CN | 102070956 | 5/2011 |
| DE | 102007003435 | 7/2008 |

(Continued)

OTHER PUBLICATIONS

Rajh, T., et al., "Surface Restructuring of Nanoparticles: An Efficient Route for Ligand—Metal Oxide Crosstalk", J. Phys. Chem. B (2002), 106, pp. 10543-10552.

(Continued)

*Primary Examiner* — Veronica F Faison
(74) *Attorney, Agent, or Firm* — Dierker & Associates, P.C.

(57) ABSTRACT

A colorant dispersion for an ink includes a liquid medium and metal oxide particles dispersed in the liquid medium. The metal oxide particles include a mixture of i) metal oxide particle cores having an organic ligand interacted with respective surfaces thereof, ii) metal oxide particle cores having the organic ligand chemically bonded to respective surfaces thereof, and iii) products of a reaction between metal ions on respective surfaces of metal oxide particle cores and the organic ligand. The organic ligand is chosen from an organic ligand having a phenol group, an organic ligand having a carboxylate group, an organic ligand having an amine group, or combinations thereof. The metal oxide particles exhibit a color that is different from a natural color of the metal oxide particle core.

20 Claims, 5 Drawing Sheets
(3 of 5 Drawing Sheet(s) Filed in Color)

(56) References Cited

U.S. PATENT DOCUMENTS

2011/0137079 A1 6/2011 Stewart et al.
2012/0038701 A1 2/2012 Schalkhammer et al.

FOREIGN PATENT DOCUMENTS

| EP | 0353544 | 2/1990 |
| JP | 04-307289 | 10/1992 |
| JP | 2004149672 | 5/2004 |
| WO | PCT/US2010/053696 | 10/2010 |
| WO | WO 2013/162513 A1 * | 10/2013 |

OTHER PUBLICATIONS

Jankovic, Ivana A., et al., "Surface Modification of Colloidal TiO2 Nanoparticles with Bidentate Benzene Derivatives", J. Phys. Chem. C, (2009), 113, pp. 12645-12652.

Xu, Chenjie, et al., "Dopamine as a Robust Anchor to Immobilize Functional Molecules on the Iron Oxide Shell of Magnetic Nanoparticles", Journal of the American Chemical Society (ACS Publications), (2004), 126 (32), pp. 9938-9939, http://pubs.acs.org/doi/abs/10.1021/ja0464802, Abstract 3 pages.

* cited by examiner

COLORANT DISPERSION FOR AN INK

BACKGROUND

Inks formed from metal oxide dispersions may be designed for printing on special media to obtain desirable effects, such as a metallic sheen (e.g., gold, bronze, etc.), pearlescent colors, and/or the like. Such inks are often stable and durable. These attributes are also desirable for more traditional inks, such as mono colorant inks. However, some native metal oxides, such as iron oxide, have an inherent rusty orange or red color that may be undesirable.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure relates generally to colorant dispersions for inks. Examples of the colorant dispersions disclosed herein include colorant particles, which are a mixture of i) metal oxide particle cores having an organic ligand interacted with respective surfaces thereof ii) metal oxide particle cores having the organic ligand chemically bonded to the respective surfaces thereof, and iii) products formed from a reaction between metal ions on the surface of the metal oxide particle cores and the organic ligand. In iii), the products formed by the reaction include complex salts (i.e., salts where the organic ligands are in coordination spheres of the metal ions) that may be partially dissolved in the liquid phase of the colorant dispersion. For instance, the complex salts may precipitate out of the liquid phase and form their own discrete phase, or the complex salts may remain dissolved in the liquid phase of the colorant dispersion, or some of the complex salt may precipitate while some of the complex salt remains in the liquid phase. In the latter example, the complex salt in the liquid phase is in equilibrium with the complex salt in the precipitated solid phase. In an example, the colorant particles of the colorant dispersion may also include bare metal oxide particles; i.e., metal oxide particles that do not react or interact with the organic ligand at all.

The colorant particles for the colorant dispersion are generated during a treatment process that involves exposing a metal oxide dispersion (including the metal oxide particle cores) to the organic ligand. The treatment process may be described as a reactive process with respect to some of the colorant particles, meaning that at least some reaction takes place between some of the metal oxide particle cores and some of the organic ligands. During these reactions, the metal oxide particle cores may partially dissolve and species ii) and/or iii) described above may form.

The reaction(s) during the treatment process may cause traditionally rust or orange-red colored iron oxide colorants to transform into monochromic, neutral, high density black colorants that are suitable for use on a variety of media, ranging from plain paper to specialty media. It is to be understood that interactions (i.e., species i) described above involving weak attractions rather than reactions) between the organic ligand and the particle cores result in the organic ligands being hydrogen or other weakly bonded or adsorbed onto the respective surfaces of the cores. These interactions, alone or in combination with the reacted particles, will also affect color changes of the colorant dispersion. On the other hand, the presence of bare metal oxide particles in the colorant dispersion, in combination with the other reacted and/or interacted metal oxide particles, may lessen the color change, e.g., where the color exhibited by the colorant dispersion may have a hue that is closer to the natural color of the metal oxide particles.

Figure 1:
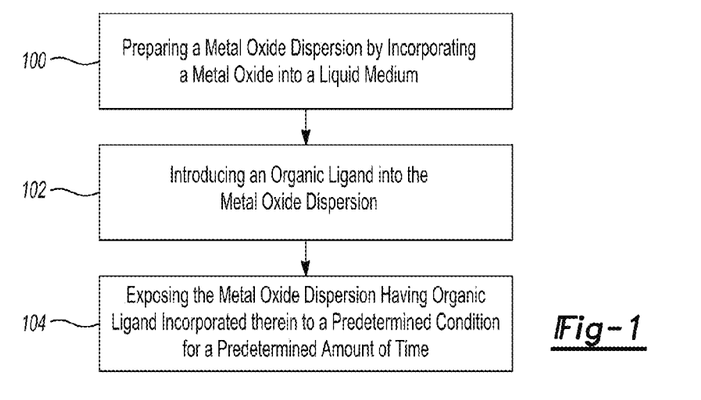
FIG. 1 is a schematic flow diagram depicting an example of a method for making a colorant dispersion for an ink.

Referring now to FIG. 1, an example of a method for forming the colorant dispersion is depicted. A metal oxide dispersion is prepared by incorporating a metal oxide (e.g., metal oxide particle cores) into a liquid medium, as shown at reference numeral 100.

It is to be understood that the liquid medium may be water, an organic solvent, or a combination of water and organic solvent. The selection of the liquid medium may depend, at least in part, on the solubility of the organic ligand(s) to be used in the liquid medium. Examples of organic solvents include diols, glycols, alcohols, 2-pyrrolidone and the like, and combinations thereof. Any mixture of the previously listed organic solvents may be mixed with water to form an aqueous liquid medium. If the selected organic ligand(s) are soluble or may become soluble in a non-aqueous solvent, then the non-aqueous solvent, such as a hydrocarbon (e.g., ISOPAR® available from Exxon Mobil, Houston, Tex.), may be selected for the liquid medium.

The metal oxide particle cores may be any iron oxide, including $Fe_2O_3$, $FeO(OH)$, $FeO$, $Fe_3O_4$, and combinations thereof. Examples of some combinations include combinations of $Fe_2O_3$ and $Fe_3O_4$, combinations of $FeO$ and $Fe_2O_3$, combinations of $FeO$ and $Fe_3O_4$, or various other combinations of two or more of the singly listed iron oxides. The metal oxide particle cores may be present in an amount ranging from about 0.5 wt % to about 30 wt % of the metal oxide dispersion, and in another example, the amount of metal oxide particle cores ranges from about 2 wt % to about 15 wt %.

Any suitable dispersant may be used to form the metal oxide dispersion. An example of a suitable dispersant is a silane coupling agent (SCA), such as SILQUEST® A1230 (Momentive Performance Materials, Albany, N.Y.), carboxylated SCAs, and/or the like. In instances where two or more SCA dispersants are used, the dispersants may be combined to form a hybrid type system. The amount of the SCA dispersant(s) included in the metal oxide dispersion ranges from about 1 wt % to about 100 wt % with respect to the weight of the metal oxide particle core/iron oxide.

Examples of suitable silane coupling agent (SCA) dispersants include alkoxysilanes with water-soluble polyether functionality, or polyether alkoxysilane dispersants. Polyether alkoxysilane dispersants may contribute to the jetting reliability of the final colorant dispersion. Examples of polyether alkoxysilane dispersants may have the general formula of structure I, II, or III provided herein. Example structure (I) is:

(Structure I)

where $R^1$, $R^2$, and $R^3$ are hydroxyl groups, linear alkoxy groups, or branched alkoxy groups. In some examples, $R^1$, $R^2$, and $R^3$ are linear alkoxy groups having from 1 to 5 carbon atoms. In yet other examples, $R^1$, $R^2$, and $R^3$ are —$OCH_3$ or —$OC_2H_5$. In an example, $R^4$ is hydrogen, a linear alkyl group, or a branched alkyl group. In some examples, $R^4$ is an alkyl group having from 1 to 5 carbon atoms.

Further, PE in structure I is a polyether oligomer chain segment of the structural formula $[(CH_2)_n$—$CH(R)$—$O]_m$, attached to the Si through an Si—C bond, where n is an integer ranging from 0 to 3, m is an integer greater than or equal to 2, and R is H or a chain alkyl group. R in the polyether oligomer may also be a chain alkyl group having 1 to 3 carbon atoms, such as $CH_3$ or $C_2H_5$. In some examples, m is an integer ranging from 2 to 30, and in other examples, m is an integer ranging from 5 to 15. The polyether chain segment PE may include repeating units of the PEG chain segment (—$CH_2CH_2$—$O$—), or a combination of PEG segments and PPG (—$CH_2$—$CH(CH_3)$—$O$—) segments. It is believed that the polyether chain PE may include repeating units of PPG segments alone, particularly when the number of PPG segments is small.

Structure (II) is:

(Structure II)

where $R^5$, $R^6$, and $R^7$ are hydrogen, linear alkyl groups, or branched alkyl groups. In some examples, $R^5$, $R^6$, and $R^7$ are linear alkyl groups having from 1 to 3 carbon atoms in chain length, and in other examples $R^5$, $R^6$, and $R^7$ are —$CH_3$ or —$C_2H_5$. $R^8$ may be any of the examples of $R^4$ described above, and PE is the same as described above for Structure I.

Structure (III) is:

(Structure III)

where $R^9$, $R^{10}$, and $R^{11}$ are the same as $R^5$, $R^6$, and $R^7$, respectively, of Structure II above. $(CH_2)_p$ is a linking group, where p is an integer ranging from 3 to 8. Further, $R^{12}$ is the same as $R^8$ of Structure II and $R^4$ of Structure I, and PE is the same as PE of Structures I and II.

Some specific examples of polyether alkoxysilane dispersants include $(CH_3O)_3Si$—$(CH_2CH_2O)_m$—$H$, $(CH_3CH_2O)_3Si$—$(CH_2CH_2O)_m$—$H$, $(CH_3O)_3Si$—$(CH_2CH_2O)_m$—$CH_3$, $(CH_3CH_2O)_3Si$—$(CH_2CH_2O)_m$—$CH_3$, $(CH_3O)_3Si$—$(CH_2CH_2O)_m$—$CH_2CH_3$, $(CH_3CH_2O)_3Si$—$(CH_2CH_2O)_m$—$CH_2CH_3$, $(CH_3O)_3Si$—$(CH_2CH(CH_3)O)_m$—$H$, $(CH_3CH_2O)_3Si$—$(CH_2CH(CH_3)O)_m$—$H$, $(CH_3O)_3Si$—$(CH_2CH(CH_3)O)_m$—$CH_3$, and $(CH_3CH_2O)_3Si$—$(CH_2CH(CH_3)O)_m$—$CH_3$. Some other specific examples of polyether alkoxysilane dispersants include $HO(CH_2CH_2O)_m$—$(CH_2)_3$—$Si(OCH_3)_3$, $HO(CH_2CH_2O)_m(CH_2)_3$—$Si(OCH_2CH_3)_3$, $CH_3$—$O$—$(CH_2CH_2O)_m$—$(CH_2)_3$—$Si(OCH_3)_3$, $CH_3$—$O$—$(CH_2CH_2O)_m$—$(CH_2)_3$—$Si(OCH_2CH_3)_3$, $C_2H_5O(CH_2CH_2O)_m$—$(CH_2)_3$—$Si(OCH_3)_3$, $C_2H_5O(CH_2CH_2O)_m(CH_2)_3$—$Si(OCH_2CH_3)_3$, $HO(CH_2CH(CH_3)O)_m$—$(CH_2)_3$—$Si(OCH_3)_3$, $HO(CH_2CH(CH_3)O)_m$—$(CH_2)_3$—$Si(OCH_2CH_3)_3$, $CH_3O(CH_2CH(CH_3)O)_m$—$(CH_2)_3$—$Si(OCH_3)_3$, and $CH_3O(CH_2CH(CH_3)O)_m$—$(CH_2)_3$—$Si(OCH_2CH_3)_3$. In any of the previous examples, the variable m may an integer equal to 2 or greater. In some examples, m is an integer ranging from 2 to 30 and, in some other examples, m is an integer ranging from 5 to 15.

It is to be understood that co-dispersants may also be used, if desired, in examples of the present disclosure. Examples of suitable co-dispersants include organic acids that may react with the metal oxide particle cores to disperse the particle cores. However, the presence of the organic acid(s) does not impart a color change to the colorant dispersion. Examples of these organic acids acting as dispersants include di-carboxylate acid structures and tri-carboxylate acid structures, e.g., citric acid, succinic acid, malonic acid, or the like, or combinations thereof. Other examples of the organic acid co-dispersants include maleic acid, malic acid, tartaric acid, oxalic acid, fumaric acid, phthalic acid, isophthalic acid, paraphthalic acids, 1,2,4,5-tetracarboxylic acid benzene, trimesic acid, and ethylenediaminetetraacetic acid (EDTA).

Without being bound to any theory, it is believed that the general role of the co-dispersant (if used) is to accelerate the dispersion preparation process, as well as to control the physical characteristics of the dispersed pigment particles. For instance, if a non-ionic SCA is used as the dispersant, then the acidic co-dispersant may add an ionic character to the colorant dispersion, which may contribute to stability and/or altering particle size. Further, the attributes of the colorant dispersion, when printed on a medium, may be altered by the type of co-dispersant used, e.g., to improve durability, to reduce strikethrough, to bind the colorant dispersion to the medium, and/or to bind individual pigment particles to one another. If a co-dispersant is used, the amount of the co-dispersant present in the metal oxide dispersion ranges from about 1 wt % to about 20 wt % with respect to the weight of the metal oxide particle core/iron oxide.

In an example, the metal oxide dispersion may be prepared by milling the metal oxide in the presence of the liquid medium and the selected dispersant. Milling to form the metal oxide dispersion may be accomplished in a bead mill, which is a wet grinding machine capable of using very fine beads having a diameter of less than 1.0 mm (e.g., less than 0.3 mm, or less than 0.1 mm) as the grinding medium, for example, Ultra-Apex Bead Mills from Kotobuki Industries Co. Ltd. The milling duration, rotor speed and temperature may be adjusted to achieve desirable results. The conditions used to make the metal oxide dispersion include milling for a duration ranging from about 60 minutes to about 180 minutes at a linear rotor speed ranging from about 6 m/s to about 12 m/s and a processing temperature ranging from about 10° C. to about 50° C. In some instances, it may be desirable to pre-wet the dispersion (i.e., pre-disperse the solids in the liquid medium before loading the mixture into the bead mill), where pre-wetting occurs for about 60 minutes to about 120 minutes. It is to be understood that the conditions used to make the dispersion may depend, at least in part, on various desired attributes of the dispersion itself. For example, and as will be described in further detail below, the ratio of dispersants to metal oxide particle cores and/or the pH may be varied in order to enhance conditions for reacting the dispersant with the metal oxide particle cores. In an example, the ratio of the total amount of dispersants to the metal oxide particle cores ranges from 1:100 to 1:1, and the pH of the dispersion ranges from about 6 to about 10.

During the formation of the metal oxide dispersion, it is to be understood that the dispersant may attach to at least a portion of the surface of the metal oxide. In instances where a co-dispersant is used, a combination of the dispersant (e.g., the SCA dispersant) and the co-dispersant (e.g., the organic acid) may be attached to the respective surfaces of the metal oxide particles. Conditions that may be varied that favorably affect the attachment of the dispersant to the metal oxide surface include the pH of the dispersion, the amount of dispersant used, and the reactivity of the dispersant to the metal oxide particle core surface. It is to be understood that at least some of these conditions are based, at least in part, on the type of dispersant used for the metal oxide dispersion. For instance, hydrolyzation of a silane coupling agent (SCA) is most favorable when the pH of the dispersion is somewhere between 3.5 and 5.0, and the attachment of the silane coupling agent to the metal oxide particle core surface is most favorable when the pH of the metal oxide dispersion is somewhere between 8.0 and 10.0.

As shown at reference numeral 102 in FIG. 1, the method also includes introducing an organic ligand into the metal oxide dispersion. In an example, the organic liquid may be added into the metal oxide dispersion after the metal oxide dispersion has been formed as described above. In another example, the organic ligand may be mixed into the liquid medium to form a mixture that is added to the metal oxide dispersion. In still another example, the preparation of the metal oxide dispersion and the introduction of the organic ligand occur simultaneously. As such, the organic ligand may be added into the liquid medium with the metal oxide particle cores and the dispersant, and the entire mixture may be processed together via milling.

The organic ligand is one that is capable of interacting or reacting with the iron oxide particles that are selected for the metal oxide dispersion and/or is capable of reacting with metal ions on respective surfaces of the iron oxide particles that are selected for the metal oxide dispersion. The organic ligand includes a phenol group, a carboxylate group, an amine group, or combinations thereof. Examples of suitable organic ligands include dihydroxy polyphenol compounds (including dihydroxy phenol compounds conjugated with an aromatic group), trihydroxy polyphenol compounds (including trihydroxy phenol compounds conjugated with an aromatic group), multihydroxy polyphenol compounds, salts thereof, and combinations thereof. Specific examples of the organic ligands include gallic acid, pyrogallol, caffeic acid, chlorogenic acid, protocatechuic acid, propyl gallate, octyl gallate, lauryl gallate, 3,4-dihydroxybenzoic acid, 2-hydroxy-1-napthoic acid, 3,5-dihydroxy-2-napthoic acid, and 2,3,4-trihydroxybenzophenone.

Some examples of the organic ligand may include a carboxylic acid group or an ester group coupled to an aromatic ring/s and is either a dihydroxy phenol compound or a trihydroxy phenol compound. A specific example of a multihydroxy (i.e., >3) polyphenol compound is tannic acid. In another example, the organic ligands may include a sulfonic acid group or phosphonic acid group (e.g., instead of a carboxylic acid group) coupled to the aromatic ring/s. An example of such an organic ligand is chromotropic acid. Another example of a suitable ligand is a single phenol with a nearby carboxylic acid functionality, such as salicylic acid. Furthermore, non-aromatic ligands with hydroxyl groups may be used, and examples of these ligands include ascorbic acid, vanillin, ethyl vanillin, and caffeine.

The amount of organic ligand added to the metal oxide dispersion will depend, at least in part, on the amount of metal oxide dispersion used. In an example, from about 5% to about 10% of organic ligand is added to an iron oxide dispersion including from about 5% to about 8% of the iron oxide. Generally, the amount of the organic ligand used may vary from about 1 wt % to about 100 wt % with respect to the metal oxide concentration. In an example, the amount of the organic ligand used may vary from about 2 wt % to about 30 wt % with respect to the metal oxide concentration.

After the organic ligand is introduced into the metal oxide dispersion, the organic ligand is solubilized. The organic ligand may be solubilized by adding a base, such as NaOH, KOH, $Na_4OH$, TMA-OH, etc., which will react with the organic ligand and improve its solubility in, e.g., a polar environment. Then, the method further includes exposing the mixture to a predetermined condition for a predetermined amount of time. During this time, the metal oxide particle cores behave in any combination of four ways. The interactions and/or reactions that take place depend, at least in part, on the type of ligand(s), the concentration of the ligand(s), and/or the active sites on the metal oxide particle core surface that are available to facilitate the interactions and/or reactions.

In a first way, the organic ligand interacts with respective surfaces of the metal oxide particle cores for surface complexation, where solubilized organic ligand-metal oxide particles are formed in the liquid medium. In an example, weak bonds form when the organic ligand interacts with the respective surfaces of the metal oxide particle cores. The weak bonds may be hydrogen bonds or any other weak bond formed between the organic ligand and the metal oxide particle core. The weak bonds may otherwise include physical bonds, such as adsorption of the organic ligand onto the surface of the metal oxide particle core.

In a second way, the organic ligand reacts with respective surfaces of the metal oxide particle cores to chemically bind the organic ligand to the surfaces. Chemical binding results when chemical bonds, e.g., covalent bonds or ionic bonds, are formed between the organic ligand and the surface of the metal oxide particle core. It is to be understood that when chemical bonds form, the surface of the metal oxide particle core is coated with the organic ligand and at least some of the metal oxide particle itself may remain intact. It is believed that when chemical bonds are formed, the ligand(s) may directly attach to metal ions of the metal oxide particle core surface.

In a third way, the organic ligand reacts with metal ions on the respective surfaces of the metal oxide particle cores to form products of complex salts that may be partially dissolved in the liquid phase of the dispersion. When these products form, the original metal oxide particle core is reacted and converted into a ligand complex, while any unreacted metal oxide particle cores remain as the original particle core. As previously mentioned, the complex salts may precipitate or crash out of the liquid phase of the dispersion, and form their own discrete phase of the dispersion. The complex salts may otherwise remain dissolved in the liquid phase of the dispersion. In some instances, the dispersion may include a combination of complex salts that have precipitated out of the liquid phase and complex salts that remain dissolved or solubilized in the liquid phase. It is to be understood that the pH of the dispersion affects the tendency of the complex salts to remain in and/or precipitate out of the liquid phase of the dispersion. For instance, the complex salts will tend to remain dissolved in the liquid phase at pH values ranging from 4 to 9, and will tend to precipitate out of the liquid phase at pH values less than 4 or greater than 9.

In a fourth way, the respective surfaces of the metal oxide particle cores do not interact and/or react with the organic ligand. In this way, the metal oxide particles remain in the dispersion as bare metal oxide particles.

In the examples disclosed herein, exposure to the predetermined condition mentioned above for a predetermined amount of time is accomplished so that a mixture of two or more of i) the metal oxide particles with surface complexation, ii) metal oxide particles with surface coating, iii) complex salts, and iv) bare metal oxide particles are present in the colorant dispersion. It is to be understood that the degree of the metal oxide particle cores that interact with organic ligands, react with organic ligands, or do not interact or react will depend, at least in part, on the type of ligands and particle cores used, the reactivity of the ligands, the reaction time, particle core size, available active sites on the particle core surfaces for reaction, etc.

In an example, the predetermined condition is heat. Heating may be accomplished at a temperature ranging from about 5° C. to about 100° C. The time for heating may depend upon the temperature that is used. For instance, at 60° C., heating may be accomplished for at least 15 minutes up to 60 minutes. In another example, heating may be accomplished for at least one hour. Temperatures of 50° C. or less may require longer exposure to heat in order to solubilize the materials and allow for interaction and/or reaction to occur.

The interactions and/or reactions that take place between the metal oxide and the organic ligand result in a colorant dispersion that exhibits a color that is different from a natural color of the metal oxide particle core. For example, native iron oxides are a rust color or burnt orange color. In instances where all or a majority of the particle cores are treated (in some way) with the organic ligands disclosed herein, the color becomes a more neutral color hue, and the color tends to be darker than the natural color of the original metal oxide. A more neutral color hue has a* and b* values that are closer to zero than those of the original metal oxide. The color hue of the treated metal oxide may be represented in terms of color space (i.e., LAB) coordinates, where L* is less than 20, and a* and b* are each less than +/−2. This is compared to the LAB coordinates of untreated metal oxide particles, where L* is greater than 50, and a* and b* are greater than or equal to +/−10 and greater than or equal to +/−20, respectively. It is to be understood that the ratio of a* and b* can also vary (based, at least in part, on the amount of organic ligands interacted or reacted with the metal oxide particle cores) to provide hue-tinted neutral colors having a reddish shade (e.g., less organic ligand and more metal oxide) or a bluish shade (e.g., more organic ligand and less metal oxide), as well as brown or gray shades. Further, the more negative b* values will provide stronger bluish shades and the larger a* values will provide stronger brownish shades. It is further to be understood that the shade of the color that is exhibited by the final colorant dispersion depends, at least in part, on the type of organic ligand that is selected and an amount of the metal oxide particle cores that are present in the metal oxide dispersion.

The percent solids present in the resulting colorant dispersion ranges from about 2% to about 60%. In another example, the percent solids ranges from about 5% to about 30%. The metal oxide particle core concentration in the colorant dispersion may range from about 1% to about 30%. In another example, the concentration of metal oxide particle cores in the colorant dispersion ranges from about 5% to about 15%.

In examples of the final colorant dispersion, the viscosity of the colorant dispersion is substantially similar to that for inks jettable via inkjet printers, e.g., the viscosity ranges from about 1 Centipoise (cps) to about 20 cps at room temperature (e.g., from 22° C. to 25° C.). In one example, the viscosity of the colorant dispersion ranges from about 2 cps to about 5 cps at room temperature.

The colorant particles in the final colorant dispersions may include metal oxide particles with surface interaction and/or with surface coating, and any of these colorant particles may have a particle size of less than 1 nm. The colorant particles in the final colorant dispersion may also or otherwise include complex salts formed by the reaction of the metal ions of the metal oxide particle and the organic ligand, and these complex salts (which are considered herein to be colorant particles) may have a particle size that is about 1 μm or larger. In an example, the colorant dispersion includes colorant particles having an average particle size ranging from 5 nm to 200 nm. The particle size renders the dispersion printable via inkjet printing.

It is to be understood that the final colorant particle size may be controlled by a number of conditions. For example, the final colorant size may be altered by selecting a particular type of organic ligand, by adjusting the pH of the colorant dispersion, by adjusting the processing time (e.g., milling time during preparation of the metal oxide dispersion), or by selecting a particular liquid medium within which the metal oxide is dispersed. For example, more steric interactions between the organic ligand and the metal oxide tend to occur with those organic ligands having a bulky size (e.g., a large molecular side group), leading to larger colorant particle sizes. In another example, strong interactions between the organic ligand and the metal oxide due to the pH of the colorant dispersion, as well as the acidity of the organic ligands may also lead to larger colorant particle sizes and possible aggregation of the particles in solution. Further, the water and solvent mixtures of the dispersion may cause further aggregation of the colorant particles, particularly with hydrophilic dispersants. Aggregation often leads to larger colorant particles sizes. It is to be understood that the size of the primary particles (i.e., the metal oxide particle cores) constitutes the lower limit of the colorant particle size without having to resort to a grinding, milling, or other like process to break the colorant particles down into smaller particles. The colorant particles (which may include individual particles or aggregated particles) may be further broken down into smaller particles by additional milling or the like, or by adjusting the pH or the solvent content of the final dispersion.

It is to be understood that inks made with examples of the processes disclosed herein are readily dispensable and printable in any type of inkjet system (e.g., continuous, thermal drop on demand (DOD) inkjet (TIJ), and piezoelectric DOD inkjet) or non-inkjet system. Examples of non-inkjet systems include those that perform non-impacting printing such as gravure and offset printing. It is to be understood that the size of the particles contained in the ink may be tailored to meet the needs of the printing system used to print the ink. In some cases, a higher solvent content may also be desirable.

In further examples of the present disclosure, two or more (e.g., three, four, etc.) separate dispersions (e.g., a first colorant dispersion, a second colorant dispersion, a third colorant dispersion, etc.) may be blended to achieve a desired set of properties (e.g., a particular color blend). Each of the first, second, etc. colorant dispersions itself is a blend/distribution of different particle types (as discussed above). In these examples, the final colorant dispersion may be a mixture of blends, with each blend having its own distribution of metal oxide particles with surface interaction, metal oxide particles with surface coating, complex salts (dispersed in the liquid phase of the dispersion and/or precipitated out of the liquid phase and forming a new discrete phase), and/or bare metal oxide particles. As such, the mixture of blends may be a matrix of one colorant particle dispersion with at least a second colorant particle dispersion.

The particles within a single dispersion may be separated, e.g., by ultracentrifugation. For example, the interacted or reacted colorant particles may be separated from the metal-ligand complexed colorant particles (i.e., the complex salts). Particles separated from different dispersions may then be blended together. For instance, a particular combination of dispersant and co-dispersant may react with a particular organic ligand (such as, e.g., gallic acid) to form a first colorant dispersion, and the same particular combination of dispersant and co-dispersant may react with another organic ligand (such as, e.g., lauryl gallate) to form a second colorant dispersion. Particles of each of the first and second colorant dispersions may be separated by, e.g., ultracentrifugation, to obtain interacted or reacted colorant particles from each of the first and second colorant dispersions and to obtain metal-ligand complexed colorant particles from each of the first and second colorant dispersions. Any of the separated particles may be combined to form another final colorant dispersion.

Examples of the dispersions as disclosed herein generally achieve desirable optical densities. In an example, the optical density of inks formed from the examples of the colorant dispersion disclosed herein may be greater than about 1.0 on plain paper, and in another example, the optical density may range from about 1.0 to about 1.5 on plain paper. In another example, the optical density of the inks formed from the examples of the colorant dispersion may be greater than about 1.7 on special media, and in yet a further example, the optical density may range from about 1.7 to about 2.0 on inkjet coated papers (e.g., HP Advanced Photo Paper, HP Vivid Photo Paper, HP Glossy Brochure Paper 180g, etc.). In other words, it is possible to achieve an optical density of 2.0 and the like by printing inks formed from the colorant dispersion disclosed herein on plain paper, and this optical density is similar to that which may be achieved with dispersions including carbon black. Furthermore, the upper limit of the optical density may be determined, in part, by the percent loading of the colorant particles and the type of medium upon which the ink formed from the colorant dispersion is printed. It is believed that an optical density ranging from 2.0 to 2.25 may be achieved for prints formed by printing the ink on plain paper, where printing is accomplished using a reactive under-printing technique that keeps the colorant particles on the surface of the paper.

Figure 9A:
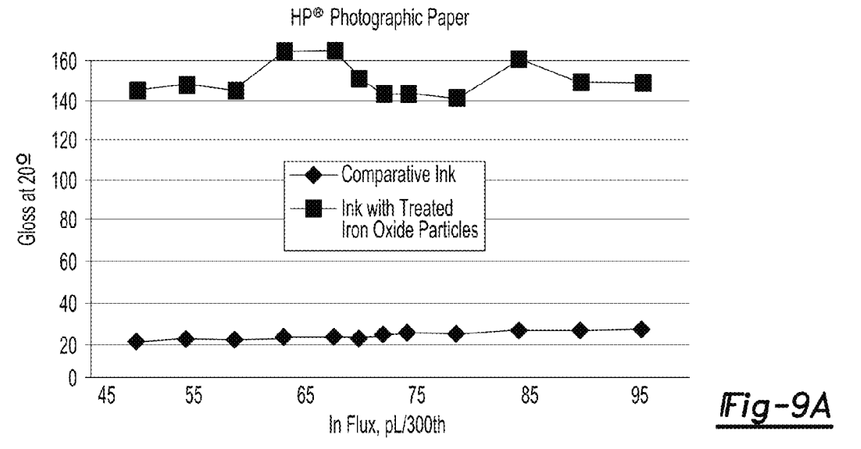
FIG. 9A is a graph depicting the gloss of a print measured at 20 degrees produced by printing an example of an ink including a colorant dispersion with treated iron oxide particles on a sheet of HP® Advanced Photo Paper, and the gloss of a print measured at 20 degrees produced by printing a comparative ink containing carbon black pigment on a sheet of HP® Advanced Photo Paper.
Figure 9B:
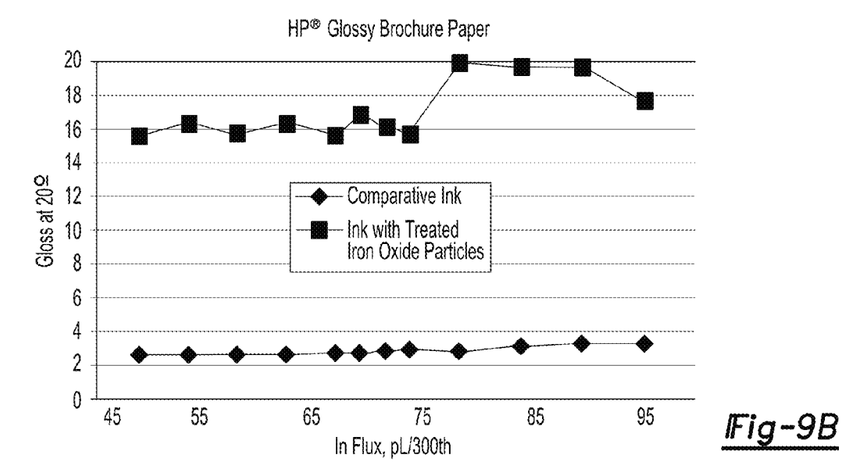
FIG. 9B is a graph depicting the gloss of a print measured at 20 degrees produced by printing an example of an ink including a colorant dispersion with treated iron oxide particles on a sheet of HP® Glossy Brochure Paper, and the gloss of a print measured at 20 degrees produced by printing a comparative ink containing carbon black pigment on another sheet of HP® Glossy Brochure Paper.

Examples of the dispersions as disclosed herein also generally achieve desirable gloss and metallic effects. For example, the colorant dispersions formed from iron oxide particles show enhanced gloss and metallic effects as compared to their non-iron oxide counterparts on special media. Examples of the enhancement in gloss of an example of the colorant dispersion disclosed herein is shown in FIGS. 9A and 9B, and will described below in conjunction with Example 7.

An example ink according to the present disclosure includes an ink vehicle (aqueous, or a combination of aqueous and non-aqueous). Any of the solvents (including water and/or the organic solvents) described hereinabove may be used as the ink vehicle. Examples of the ink further include an example of the colorant dispersion as disclosed herein incorporated into the ink vehicle. Further examples of the ink include an ink vehicle having incorporated therein a mixture of two or more examples of the colorant dispersion as disclosed herein.

To further illustrate the present disclosure, examples are given herein. It is to be understood that these examples are provided for illustrative purposes and are not to be construed as limiting the scope of the disclosed example(s).

EXAMPLES

Example 1

Tests were conducted in order to show effects of examples of the post-treatment process of an iron oxide-based colorant dispersion as disclosed herein. The dispersion was formed from native iron oxide (Inframat $Fe_3O_4$) combined with about 50 wt % (with respect to amount of native iron oxide) of SILQUEST® A1230 dispersant and about 10% (with respect to amount of native iron oxide) citric acid co-dispersant in a liquid medium. The size of the native iron oxide particles was measured to be about 31.7 nm, and the dispersion contained about 8 wt % of the native iron oxide particles.

Figure 2A:
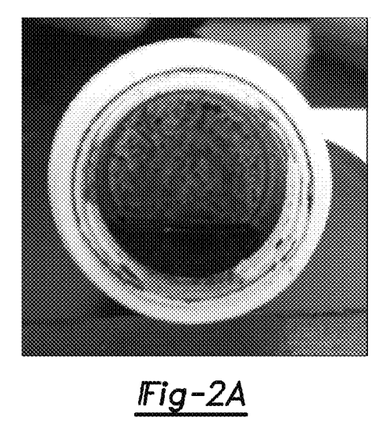
FIG. 2A is a photograph depicting an example of a colorant dispersion including treated iron oxide particles immediately after preparation of the dispersion.
Figure 2B:
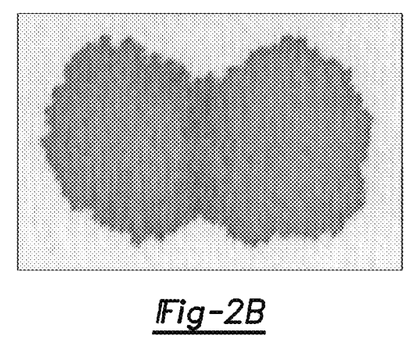
FIG. 2B is a photograph depicting the colorant dispersion of FIG. 2A blotched on a TEXWIPE® cloth.

About 5 wt % of gallic acid was added to the dispersion, and the gallic acid reacted with the particle surface to form treated iron oxide particles. A photograph of the dispersion is shown in FIG. 2A. The dispersion was also blotted on a piece of TEXWIPE® cloth (Texwipe, Kernersville, N.C.), and a photograph of the blot was also taken. This photograph is shown in FIG. 2B. FIGS. 2A and 2B clearly show that the color of the dispersion (either alone or when blotted onto the Texwipe® cloth) exhibited a burnt reddish color.

Figure 3A:
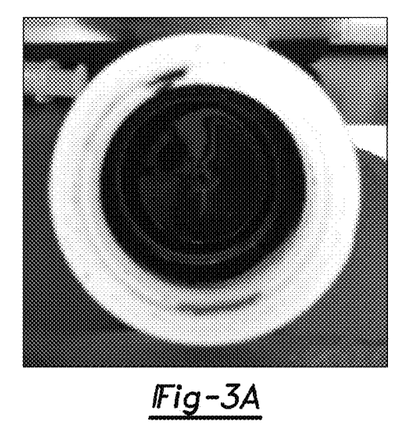
FIG. 3A is a photograph depicting the example of the colorant dispersion including the treated iron oxide particles of FIG. 2A after about 60 minutes of heating.
Figure 3B:
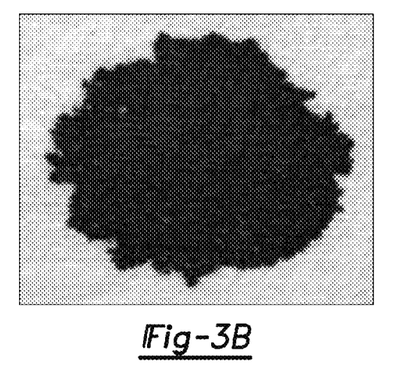
FIG. 3B is a photograph depicting the colorant dispersion of FIG. 3A blotched on a TEXWIPE® cloth.

The dispersion was then heated for about 60 minutes at 60° C. After the first 15 minutes of heating, by visual inspection, the color of the dispersion started to change from the burnt reddish color to a dark/almost blackish color. Further darkening of the color of the dispersion was also observed after 45 minutes of heating. Then, after 60 minutes of heating, a photograph of the dispersion was taken, and this photograph is shown in FIG. 3A. The dispersion was also blotted on another piece of TEXWIPE® cloth, and a photograph of the blot was taken. This photograph is shown in FIG. 3B. FIGS. 3A and 3B both show that the color of the heated dispersion (either alone or when blotted on the TEXWIPE® cloth) exhibited a blackish color, which is a clear change in color when compared to the dispersion prior to heating.

Example 2

Figure 4A:
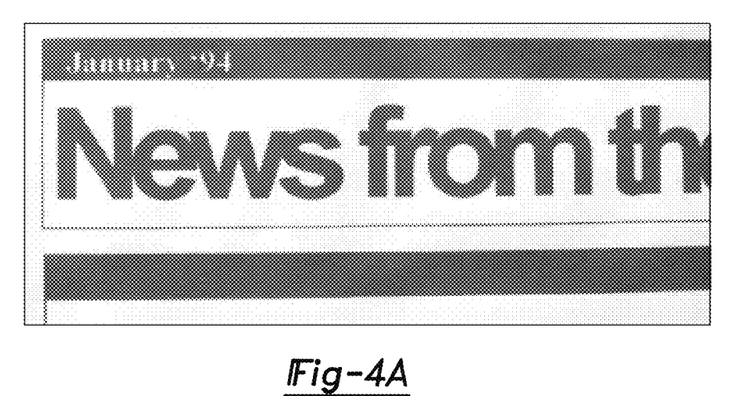
FIGS. 4A and 4B are photographs of a print sample on plain paper made with an example of the iron oxide dispersion disclosed herein (FIG. 4A) and a comparative print sample on plain paper made with a native iron oxide dispersion (FIG. 4B)

An ink was formed utilizing the colorant dispersion including the treated iron oxide particles of Example 1 (i.e., using the dispersion that was heated for 60 minutes). The ink also included about 10 wt % 2-pyrrolidone and about 0.1 wt % SURFYNOL® 465, and the pH of the ink was measured to be about 8.5. About 4 wt % of the iron oxide colorant dispersion was used in the ink formulation. The ink was then printed on a sheet of HP® 30% recycled office paper, which is a plain paper medium. The optical density (a unitless measurement) of a print formed by the printing of the ink was measured (using a MacBeth Spectroscan) to be about 1.1. A photograph of the print is shown in FIG. 4A, and the print exhibited a blackish color.

Figure 4B:
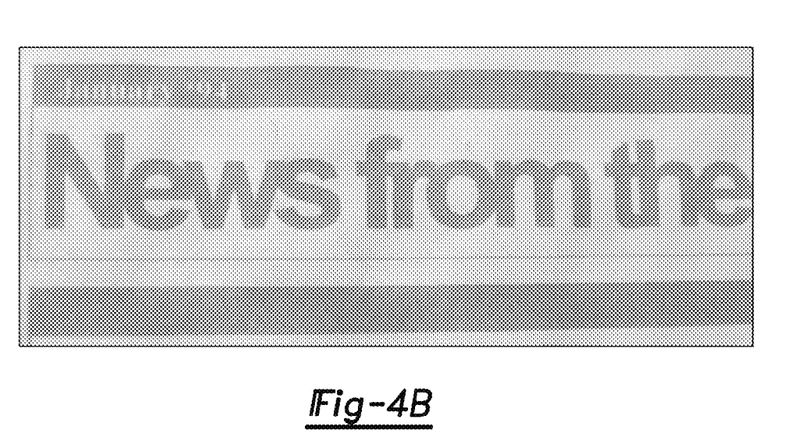

A comparative ink was also formed, and the formulation of the comparative ink was the same as for the ink including the treated iron oxide dispersion, except that the comparative ink included about 3.75 wt % of an iron oxide dispersion including native iron oxide particles (i.e., the dispersion of Example 1 that was not subjected to heating). The pH of the comparative ink was 8.5. The comparative ink was also printed on HP® 30% recycled office paper, and the optical density of a print formed by the printing of the comparative ink was measured to be about 0.32. A photograph of the print is shown in FIG. 4B, and the print exhibited a burnt yellowish color.

Example 3

Figure 5A:
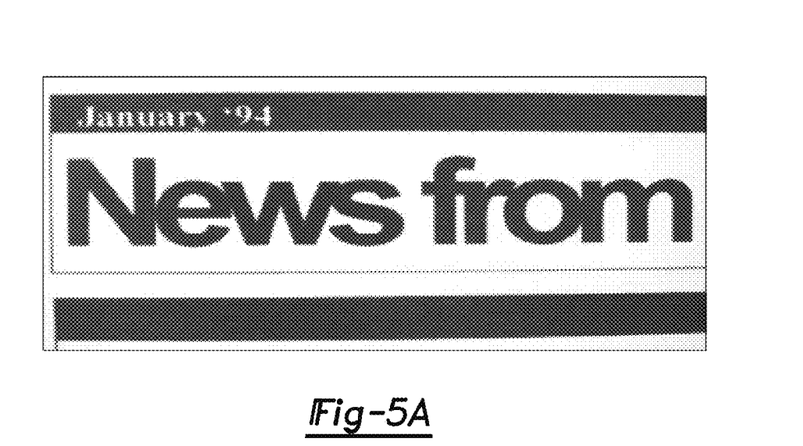
FIGS. 5A and 5B are photographs of a print sample on brochure media made with an example of the iron oxide dispersion disclosed herein (FIG. 5A) and a comparative print sample on brochure media made with a native iron oxide dispersion (FIG. 5B)

Another ink was formed which included the same composition of the ink of Example 2 that contained the colorant dispersion included treated iron oxide particles. However, in Example 3, the iron oxide particles were initially treated utilizing 7.5 wt % (instead of 10 wt %) of the citric acid as the co-dispersant. This ink was then printed on a sheet of HP® Brochure 180g, which is a brochure media, and the optical density of a print formed by the printing of this ink was measured to be about 1.5. A photograph of the print is shown in FIG. 5A, and the print exhibited a blackish color on the brochure media.

Figure 5B:
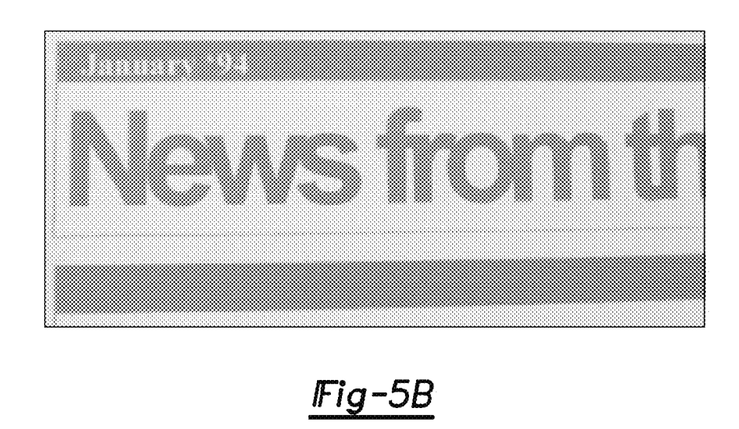

The comparative ink from Example 2 was also printed on a sheet of brochure media, and the optical density of a print formed by the printing of the comparative ink on the brochure media was measured to be about 0.34. A photograph of the print is shown in FIG. 5B, and the print also exhibited a burnt yellowish color.

Example 4

Figure 6A:
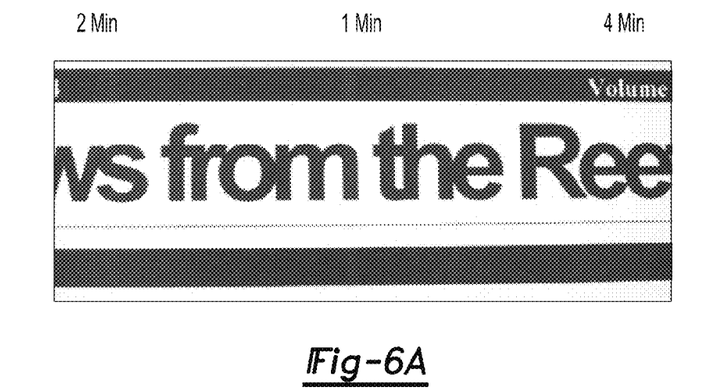
FIGS. 6A and 6B are photographs illustrating the durability of a print sample on brochure media made with an example of the iron oxide dispersion disclosed herein (FIG. 6A) and of a comparative print sample on brochure media made with a carbon black ink sample (FIG. 6B)

The durability of print samples produced on brochure media was then tested. One print was formed by printing an ink including a colorant dispersion including treated iron oxide particles onto a sheet of brochure media. The colorant dispersion was the same as that used to form the ink in Example 3. The ink was formed by incorporating the colorant dispersion into a vehicle that included about 12 wt % of 2-pyrrolidone, about 9 wt % of 1,2-propanediol, and about 0.1 wt % SURFYNOL® 465. The pH was adjusted to fall between 8 and 9. Scratching was performed utilizing a custom made automatic scratch test tool. A photograph of the print sample subjected to the scratch tests is shown in FIG. 6A. As can be seen from the photograph in FIG. 6A, no scratch marks are evident at the various times that the scratch test was performed.

Figure 6B:
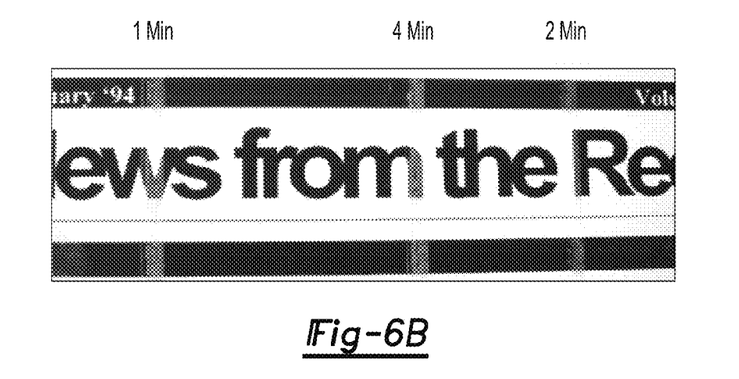

Another print was formed by printing a comparative ink on a sheet of brochure media, and then subjecting the print to the same scratch test performed at 1 minute, 2 minutes, and 4 minutes after printing. This comparative ink was formed utilizing a carbon black pigment incorporated into the same vehicle (i.e., 12 wt % of 2-pyrrolidone, about 9 wt % of 1,2-propanediol, and about 0.1 wt % SURFYNOL® 465). The amount of carbon black incorporated into the vehicle was the same as the amount of treated iron oxide particles incorporated into the vehicle to form the ink above. Scratching was then performed, and a photograph of the scratch tests is shown in FIG. 6B. As can be seen from FIG. 6B, scratch marks are clearly shown after 1 minute, 2 minutes, and 4 minutes of printing.

Example 5

An ink was formed by incorporating a colorant dispersion containing treated iron oxide particles into a vehicle. The iron oxide particles of the colorant dispersion were treated utilizing a mixed organic ligand system. The colorant dispersion was prepared by mixing a native iron oxide dispersion, which contained native iron oxide particles having an average particle size of about 50 nm, with about 50 wt % (with respect to amount of native iron oxide) of SILQUEST® A1230 dispersant and about 2 wt % (with respect to amount of native iron oxide) citric acid. The iron oxide particle and dispersants mixture was treated with about 2.5 wt % chlorogenic acid for about 30 minutes at about 60° C., followed by treatment with 2.5 wt % gallic acid for about 60 minutes at about 60° C. The colorant dispersion was then incorporated into a vehicle of about 10 wt % 2-pyrrolidone.

The ink was printed on a sheet of HP® 30% recycled paper to form a print, and the optical density of the print was measured to be about 1.37. A photograph of the print is shown in FIG. 7A.

A commercially available comparative ink was used, which contained a carbon black pigment in an ink vehicle. The ink was printed on a sheet of HP® 30% recycled paper to form a print, and the optical density of the print was measured to be about 1.44. A photograph of the print is shown in FIG. 7B.

Figure 7A:
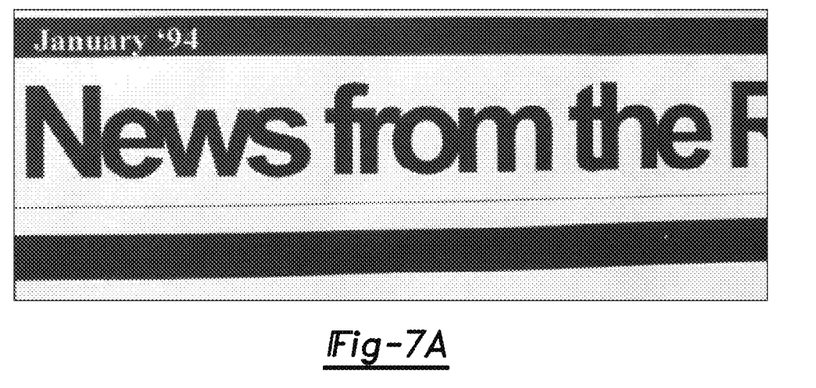
FIGS. 7A and 7B are photographs of a print sample on plain paper made with an example of the iron oxide dispersion disclosed herein (FIG. 7A) and a comparative print sample on plain paper made with a carbon black ink (FIG. 7B)
Figure 7B:
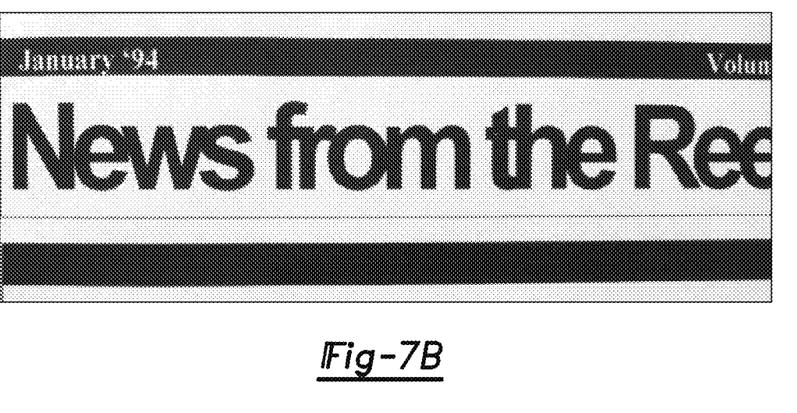

As can be seen from the photographs of FIGS. 7A and 7B, the print formed by the ink containing the treated iron oxide exhibited substantially the same print quality on plain paper as the print formed by the ink containing the carbon black pigment.

Example 6

Figure 8A:
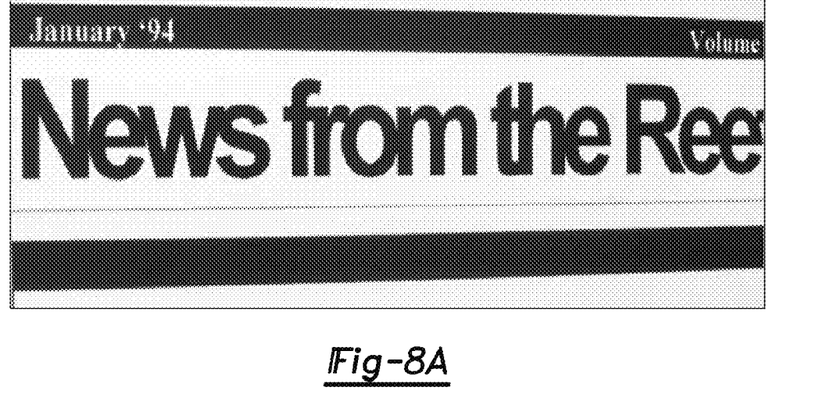
FIGS. 8A and 8B are photographs of a print sample on brochure media made with an example of the iron oxide dispersion disclosed herein (FIG. 8A) and a comparative print sample on brochure media made with a carbon black ink (FIG. 8B)
Figure 8B:
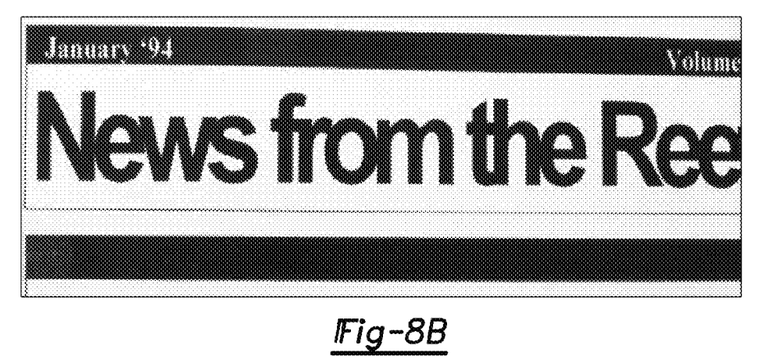

FIGS. 8A and 8B are photographs of respective print samples formed by printing the ink from Example 5 and the comparative ink from Example 5 on brochure media (i.e., HP® Brochure 180g). The optical density of the print formed by the ink was measured to be about 1.7, and the optical density of the print formed by the comparative ink was measured to be about 2.0. From these photographs, the print formed by the ink containing the treated iron oxide exhibited substantially the same print quality on brochure media as the print formed by the ink containing the carbon black pigment.

Example 7

An ink was formed by incorporating a colorant dispersion containing treated iron oxide particles into a vehicle which included 7.5 wt % 2-ethyl-2-(hydroxymethyl)-1,3-propanediol) (EHPD) or trimethyolpropane, 7.5 wt % DANTOCOL® DHE (Lonza), and a balance of water. The pH was 6.5. The iron oxide particles of the colorant dispersion were treated utilizing sodium gallate. A comparative ink, namely HP94 black ink, was also utilized in this Example. The inks were printed on two types of media; HP® Advanced Photo Paper and HP® Glossy Brochure Paper.

The gloss was measured at 20 degrees for prints formed with the ink and with the comparative ink on the two media, and the results are shown in FIGS. 9A and 9B. The gloss was measured using a micro-Tri-Gloss meter available from BYK Gardiner. From FIGS. 9A and 9B, the results clearly show that the gloss of the print formed by the ink including the treated iron oxide particles was significantly higher than the gloss of the print formed by the ink including the carbon black pigment for both types of media tested.

In describing and claiming the examples disclosed herein, the singular forms "a", "an", and "the" include plural referents unless the context clearly dictates otherwise.

It is to be understood that the ranges provided herein include the stated range and any value or sub-range within the stated range. For example, a range from about 1 cps to about 20 cps should be interpreted to include not only the explicitly recited limits of about 1 cps to about 20 cps, but also to include individual values, such as 3 cps, 5 cps, 16 cps, etc., and sub-ranges, such as from about 5 cps to about 15 cps, from about 10 cps to about 13 cps, etc. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

What is claimed is:

1. A colorant dispersion for an ink, comprising:
a liquid medium;
metal oxide particles dispersed in the liquid medium, the metal oxide particles including a mixture of i) metal oxide particle cores having an organic ligand interacted with respective surfaces thereof, ii) metal oxide particle cores having the organic ligand chemically bonded to respective surfaces thereof, and iii) products of a reaction between metal ions on respective surfaces of metal oxide particle cores and the organic ligand, the organic ligand being chosen from an organic ligand having a phenol group, an organic ligand having a carboxylate group, an organic ligand having an amine group, or combinations thereof; and
a dispersant to react with the metal oxide particle cores in the liquid medium, the dispersant being a silane coupling agent;
wherein the metal oxide particles exhibit a color that is different from a natural color of the metal oxide particle core;
and wherein the metal oxide particle core is an iron oxide chosen from $Fe_2O_3$, $Fe_3O_4$, FeO, FeO(OH), and combinations thereof.

2. The colorant dispersion as defined in claim 1 wherein the metal oxide particles further include metal oxide particle cores without an organic ligand.

3. The colorant dispersion as defined in claim 1 wherein the metal oxide particles individually have a particle size ranging from about 1 nm to about 1 μm.

4. The colorant dispersion as defined in claim 1 wherein the liquid medium includes water, an organic solvent, or a combination of water and the organic solvent.

5. A colorant dispersion for an ink, comprising:
a liquid medium;
metal oxide particles dispersed in the liquid medium, the metal oxide particles including a mixture of i) metal oxide particle cores having an organic ligand interacted with respective surfaces thereof, ii) metal oxide particle cores having the organic ligand chemically bonded to respective surfaces thereof, and iii) products of a reaction between metal ions on respective surfaces of metal oxide particle cores and the organic ligand, the organic ligand being chosen from an organic ligand having a phenol group, an organic ligand having a carboxylate group, an organic ligand having an amine group, or combinations thereof;
a dispersant to react with the metal oxide particle cores in the liquid medium, the dispersant being a silane coupling agent; and
a co-dispersant to react with the metal oxide particle cores in the liquid medium, the co-dispersant being an organic acid chosen from one that does not impart a color change to the colorant dispersion;
wherein the metal oxide particles exhibit a color that is different from a natural color of the metal oxide particle core;
and wherein the metal oxide particle core is an iron oxide chosen from Fe2O3, Fe3O4, FeO, FeO(OH), and combinations thereof.

6. The colorant dispersion as defined in claim 5 wherein the co-dispersant is citric acid.

7. A colorant dispersion for an ink, comprising:
a liquid medium; and
metal oxide particles dispersed in the liquid medium, the metal oxide particles including a mixture of i) metal oxide particle cores having an organic ligand interacted with respective surfaces thereof, ii) metal oxide particle cores having the organic ligand chemically bonded to respective surfaces thereof, and iii) products of a reaction between metal ions on respective surfaces of metal oxide particle cores and the organic ligand;
wherein:
the metal oxide particles exhibit a color that is different from a natural color of the metal oxide particle core;

the metal oxide particle core is an iron oxide chosen from Fe2O3, Fe3O4, FeO, FeO(OH), and combinations thereof; and the organic ligand is chosen from dihydroxy polyphenol compounds, trihydroxy polyphenol compounds, multihydroxy polyphenol compounds, trihydroxy phenol compounds conjugated with an aromatic group, dihydroxyl phenol compounds conjugated with an aromatic group, salts thereof, and combinations thereof.

8. The colorant dispersion as defined in claim 1 wherein the organic ligand is chosen from one of the following groups:
   i) any of gallic acid, pyrogallol, caffeic acid, chlorogenic acid, protocatechuic acid, propyl gallate, octyl gallate, lauryl gallate, 3,4-dihydroxybenzoic acid, 2-hydroxy-1-napthoic acid, 3,5-dihydroxy-2-napthoic acid, or 2,3,4-trihydroxybenzophenone;
   ii) a single phenol with a nearby carboxylic acid functionality; or
   iii) a non-aromatic ligand with hydroxyl groups.

9. The colorant dispersion as defined in claim 1 wherein the color exhibited by the colorant dispersion is dependent on at least the type of organic ligand and an amount of the metal oxide particles present in the colorant dispersion.

10. The colorant dispersion as defined in claim 6 wherein the color exhibited by the colorant dispersion exhibits a hue having LAB coordinates of $L^*$ that is less than than 20, $a^*$ that is less than +/−2, and $b^*$ that is less than +/−2.

11. An ink, comprising:
    an ink vehicle; and
    a colorant dispersion incorporated into the ink vehicle, the colorant dispersion including:
       a liquid medium; and
       metal oxide particles dispersed in the liquid medium, the metal oxide particles including a mixture of i) metal oxide particle cores having an organic ligand interacted with respective surfaces thereof, ii) metal oxide particle cores having the organic ligand chemically bonded to respective surfaces thereof, and iii) products of a reaction between metal ions on respective surfaces of metal oxide particle cores and the organic ligand, the organic ligand being chosen from an organic ligand having a phenol group, an organic ligand having a carboxylate group, an organic ligand having an amine group, or combinations thereof;
    wherein the metal oxide particles exhibit a color that is different from a natural color of the metal oxide particle core.

12. The ink as defined in claim 11 wherein the colorant dispersion is a first colorant dispersion, and wherein the ink further comprises a second colorant dispersion blended with the first colorant dispersion, the second colorant dispersion including:
    a second liquid medium; and
    second metal oxide particles dispersed in the second liquid medium, the second metal oxide particles including a mixture of i) metal oxide particle cores having an organic ligand interacted with respective surfaces thereof, ii) metal oxide particle cores having the organic ligand chemically bonded to respective surface surfaces thereof, and iii) products of a reaction between metal ions on respective surfaces of the metal oxide particle cores and the organic ligand;

wherein the second colorant dispersion has a particle distribution that is different from that of the first colorant dispersion, the different particle distribution of the first and second colorant dispersions rendering the first and second colorant dispersions to exhibit different colors;

and wherein the blend of the first colorant dispersion and the second colorant dispersion exhibits a color that is different from the color of the first colorant dispersion alone and is different from the second colorant dispersion alone.

13. The ink as defined in claim 11 wherein the metal oxide particle core is an iron oxide chosen from $Fe_2O_3$, $Fe_3O_4$, FeO, FeO(OH), and combinations thereof.

14. A method of making the colorant dispersion of claim 1, the method comprising:
    preparing a metal oxide dispersion by incorporating the metal oxide particles into the liquid medium;
    introducing the organic ligand into the metal oxide dispersion; and
    exposing the metal oxide dispersion having the ligand incorporated therein to a predetermined condition for a predetermined amount of time, thereby i) causing the organic ligand to interact with some of the metal oxide particles, ii) causing the organic ligand to chemically bond to some of the metal oxide particles, and iii) causing the ligand to react with some of the metal oxide particles to form a product.

15. The method as defined in claim 14 wherein the preparing of the metal oxide dispersion includes treating the metal oxide particles with i) the silane coupling agent or ii) the silane coupling agent and an organic acid.

16. The method as defined in claim 14 wherein the preparing of the metal oxide dispersion and the introducing of the organic ligand into the metal oxide dispersion is accomplished during the same step.

17. The method as defined in claim 14 wherein the predetermined condition is any of heat or processing, and wherein: when the predetermined condition is heat, the exposing is accomplished by heating the metal oxide dispersion having the ligand incorporated therein to a temperature ranging from about 5° C. to about 100° C.; and when the predetermined condition is processing, the exposing is accomplished by milling the dispersion for a duration of about 60 minutes to about 180 minutes at a linear rotor speed ranging from about 6 m/s to about 12 m/s at a processing temperature ranging from about 10° C. to about 50° C.

18. The method as defined in claim 14, further comprising controlling any of a characteristic or a color of the metal oxide dispersion, the controlling being accomplished by any of selecting a type of the organic ligand, adjusting a pH of the colorant dispersion, adjusting a processing time, or changing the liquid medium within which the metal oxide particles are dispersed.

19. The method as defined in claim 14 wherein after exposing is accomplished, the colorant dispersion exhibits a color that is different from a natural color of the metal oxide.

20. The colorant dispersion as defined in claim 8 wherein the non-aromatic ligand with hydroxyl groups is selected from the group consisting of ascorbic acid, vanillin, ethyl vanillin, and caffeine.

* * * * *

UNITED STATES PATENT AND TRADEMARK OFFICE
CERTIFICATE OF CORRECTION

| | | |
|---|---|---|
| PATENT NO. | : 9,017,468 B2 | Page 1 of 1 |
| APPLICATION NO. | : 13/455914 | |
| DATED | : April 28, 2015 | |
| INVENTOR(S) | : Raymond Adamic et al. | |

It is certified that error appears in the above-identified patent and that said Letters Patent is hereby corrected as shown below:

IN THE CLAIMS

In column 15, line 15, in Claim 8, delete "napthoic" and insert -- naphthoic --, therefor.

In column 15, line 15, in Claim 8, delete "napthoic" and insert -- naphthoic --, therefor.

In column 15, line 26, in Claim 10, delete "than than" and insert -- than --, therefor.

Signed and Sealed this
Twenty-fourth Day of November, 2015

Michelle K. Lee
*Director of the United States Patent and Trademark Office*